US011673145B2

(12) United States Patent
Garin Rotondaro et al.

(10) Patent No.: US 11,673,145 B2
(45) Date of Patent: Jun. 13, 2023

(54) APPARATUS FOR TRANSFORMING ORGANIC AND INORGANIC SOLID URBAN WASTE INTO AGGREGATES

(71) Applicant: Ibircom S.A., Montevideo (UY)

(72) Inventors: Inaki Jose Garin Rotondaro, Madrid (ES); Oscar Miguel Gnadinger, Vicente Lopez (AR)

(73) Assignee: IBIRCOM S.A., Montevideo (UY)

( * ) Notice: Subject to any disclaimer, the term of this patent is extended or adjusted under 35 U.S.C. 154(b) by 181 days.

(21) Appl. No.: 17/159,068

(22) Filed: Jan. 26, 2021

(65) Prior Publication Data

US 2021/0146372 A1 May 20, 2021

Related U.S. Application Data

(62) Division of application No. 15/745,408, filed as application No. PCT/ES2015/070552 on Jul. 15, 2015, now Pat. No. 10,933,425.

(51) Int. Cl.
*B02C 18/00* (2006.01)
*B02C 18/14* (2006.01)
(Continued)

(52) U.S. Cl.
CPC .......... *B02C 18/0084* (2013.01); *B02C 18/14* (2013.01); *B02C 18/2216* (2013.01);
(Continued)

(58) Field of Classification Search
CPC ............ B02C 18/0084; B02C 18/2216; B02C 18/2233; B02C 18/14; B09B 3/00;
(Continued)

(56) References Cited

U.S. PATENT DOCUMENTS

| 5,037,286 A | 8/1991 | Roberts |
| 2002/0016997 A1 | 2/2002 | Jonsson |

(Continued)

FOREIGN PATENT DOCUMENTS

| EP | 0682983 A1 | 11/1995 |
| JP | S53110260 A | 9/1978 |

OTHER PUBLICATIONS

International Search Report with English Language Translation, dated Apr. 25, 2016, Application No. PCT/ES2015/070552.

*Primary Examiner* — Shelley M Self
*Assistant Examiner* — Mohammed S. Alawadi
(74) *Attorney, Agent, or Firm* — Womble Bond Dickinson (US) LLP

(57) ABSTRACT

Method and apparatus for transforming organic and inorganic solid urban waste into aggregates, comprising an extruding machine connected to a reactor. The extruding machine is formed by an extrusion cylinder through which a piston circulates inside an extrusion cavity, which comprises three sections and is fed with a parget obtained after pre-processing the waste. The end of the third section is connected to the reactor through an opening. The reactors longitudinal shaft is formed by a rotatory steel shaft in which some steel blades are arranged, whose ends play the roles of cutting, hammering, punching and hydraulic helix as they rotate. Between the end of the blades and the wall of the reactor, there is a clearance of more than 0.1 mm of thickness. The reactor has a discharge valve to discharge the parget present in the boundary area through some openings, once it has been processed by a series of pressure, vibration energy and decompression cycles.

16 Claims, 6 Drawing Sheets

(51) Int. Cl.
  *B02C 18/22* (2006.01)
  *B02C 23/18* (2006.01)
  *B09B 3/20* (2022.01)
  *B09B 3/25* (2022.01)
  *C04B 18/02* (2006.01)
  *C04B 18/30* (2006.01)
  *C04B 40/00* (2006.01)
  *B09B 3/00* (2022.01)

(52) U.S. Cl.
  CPC .......... *B02C 18/2233* (2013.01); *B02C 23/18* (2013.01); *B09B 3/20* (2022.01); *B09B 3/25* (2022.01); *C04B 18/021* (2013.01); *C04B 18/305* (2013.01); *C04B 40/0071* (2013.01); *C04B 40/0082* (2013.01); *Y02W 30/91* (2015.05)

(58) Field of Classification Search
  CPC ....... B09B 3/20; B09B 3/0025; B09B 3/0041; C04B 40/0082; C04B 40/0071; C04B 18/021; C04B 18/305; Y02W 30/78; Y02W 30/91
  See application file for complete search history.

(56) References Cited

U.S. PATENT DOCUMENTS

| | | | |
|---|---|---|---|
| 2008/0213124 A1* | 9/2008 | Hengl | B09B 3/0075 422/301 |
| 2010/0282587 A1* | 11/2010 | Brentnall | F28G 1/08 15/97.1 |
| 2011/0111456 A1* | 5/2011 | Medoff | B01J 19/081 435/68.1 |
| 2014/0209716 A1* | 7/2014 | Kulesa | B29B 17/0036 241/21 |
| 2016/0045841 A1 | 2/2016 | Kaplan et al. | |
| 2017/0227133 A1* | 8/2017 | Mitton | B01D 21/286 |
| 2018/0119035 A1 | 5/2018 | Tamir | |
| 2018/0306061 A1 | 10/2018 | Husband et al. | |

* cited by examiner

APPARATUS FOR TRANSFORMING ORGANIC AND INORGANIC SOLID URBAN WASTE INTO AGGREGATES

TECHNICAL FIELD OF THE INVENTION

The invention relates to a method for transforming solid urban waste into aggregates. The invention also relates to an apparatus for transforming solid urban waste into aggregates.

BACKGROUND

Even in developed countries the collection, transport, separation and final disposition of the components of solid urban waste is both an economic and environmental problem since, in an ideal situation, the 100% of solid urban waste should be recycled for reuse: as raw material, as a source of valuable elements, etc.

For example, in the case of glass, plastics and metals, as raw material for manufacturing new containers: bottles, vessels, cans, etc.

In the case of organic matter of biological origin, for example, as raw material for preparing balanced feed, manure and fertilizers.

In less developed or developing countries, the collection, transport and final disposition of solid urban waste usually ends up in the formation of huge open dumps or dumps covered with a layer of soil.

In general, the invention relates to the treatment, recovery and recycling of those components that are part of solid urban waste.

Particularly, the present invention refers to a method and an apparatus for transforming organic and inorganic solid urban waste into aggregates once the batteries, ferrous and non-ferrous metal components, non-contaminated bottles, glass and plastic containers and possibly any organic or inorganic material that, owing to its hardness or volume—such as cobblestone and hard wood pieces—is not adequate for being treated by the process of the present invention, have been previously separated. The remaining waste that may not be recycled is referred to as 'rejection'.

Rejection is understood as those organic and inorganic elements that, as a result of being inappropriately managed, are cross-contaminated and cannot be recycled, and which are generally buried.

The aim of this invention is to solve the problem that arises from this rejection.

In the context of the present invention, the expression 'organic and inorganic solid urban waste' means a combination of waste of mainly biological origin generated by people as a result of food consumption.

Examples of this waste are bones, meat remainders, cartilages, greases, oils, vegetables, fruits, cereals, oil plants, infusions, etc., generally accompanied by remaining inorganic waste, such as bags and plastic, paper, cardboard and glass containers, which are contaminated with organic waste.

On the other hand, in the context of the present invention, the term "aggregate' means a granulated, sterile, dry product of petrous nature, such as rubble and stones, which comply with the EPA SW486 and EPA 1310 standards. That is, a product that will be suitable for use in mortars and road backfills.

DISCLOSURE OF THE INVENTION

The object of the invention is a method for transforming solid urban waste into aggregates, comprising:
a selection and preparation stage of a rejection from solid waste, obtaining a mixture characterised in that it comprises:
a feeding stage of an apparatus for transforming organic and inorganic solid urban waste into aggregates, said apparatus comprising an extruding machine and a reactor, wherein the extruding machine comprises an extrusion cylinder through which a piston circulates inside an extrusion cavity that defines an extrusion axis; the end of the extrusion cavity is hermetically connected to the reactor; the longitudinal shaft of the reactor comprises a rotatory shaft in which some blades are arranged; between the end of the blades and the wall or dome of the reactor there is a clearance, which is referred to as the boundary layer of the reactor; the rotatory shaft of the reactor and the blades are jointly referred to as rotor,
a compression stage where the mixture is compressed by the piston of the extruding machine moving forward until it comes into contact with the blades of the reactor, which reject the mixture, propelling it to the interior of the extrusion chamber, and prevent it from moving forward with the resulting increase of pressure
a processing stage where:
[a] when the piston moves forward, it further compresses the mixture and forces it to penetrate the boundary layer of the reactor, forming a perimeter film, [b] the reactor shaft enters into resonance, where the potential energy built up by the rotor shaft is released as an emission of a shock wave train, subjecting the mixture that is inside the extrusion cavity to violent stirring, and also subjecting the mixture which is in the boundary layer to pressure peaks produced by the vibration of the rotor shaft, [c] once the resonance phenomenon is finished, the pressure on the piston of the extruding machine is reduced, decompressing the mixture, and the compression of the mixture on the rotor is repeated until it enters into resonance once again and there is a new emission of shock waves, and [d] the resonance and decompression cycles are repeated until the temperature of the mixture reaches 85° C. to 98° C., preferably 92° C., and
a discharging stage.

In the dependent claims, various advantageous alternatives and preferred embodiments of the method according to the invention are described.

Another object of the invention is an apparatus (100) for transforming organic and inorganic solid urban waste into aggregates, characterised in that it comprises:
an extruding machine connected to a reactor;
wherein the extruding machine comprises an extrusion cylinder through which a piston circulates inside an extrusion cavity that defines an extrusion axis,
the end of the extrusion cavity is hermetically connected to the reactor;
the reactor is a drum with rotational symmetry whose longitudinal shaft is coupled (preferably transversally, at 90° to the extrusion axis), by means of an opening, with the end of the extrusion cavity of the cylinder of the extruding machine;
the longitudinal shaft of the reactor comprises a rotatory shaft that is inserted into the beds, which are arranged at the ends of the reactor; in said shaft some steel blades are arranged; between the end of the blades and the wall or dome of the reactor there is a clearance, referred to as boundary layer of the reactor,
wherein the rotatory shaft of the reactor and the blades are jointly referred to as rotor, and wherein the reactor has a discharge valve.

In the dependent claims, various advantageous alternatives and preferred embodiments of the apparatus according to the invention are described.

BRIEF DESCRIPTION OF THE DRAWINGS

Further advantages and characteristics of the invention are appreciated from the following description, where, without limitations, some preferred embodiments of the invention are described, mentioning the attached drawings. The Figures show:

FIG. 3B shows the valve of the reactor being opened, allowing the unloading of the mixture through the boundary layer of the reactor and the openings at the bottom of thereactor.

FIGS. 4A, 4B, 4C, 4D, and 4E are a group of views of the blades that support the rotor shaft, wherein:

FIG. 4A represents a ground view of the internal blade that supports the rotor shaft.

FIG. 4B represents a side front view of the internal blade that supports the rotor shaft.

FIG. 4C represents a cross-section of the internal blade at B-B. FIG. 4D represents a cross-section of the internal blade at A-A.

FIG. 4E is a perspective view of one of the side blades (400) that supports the rotor shaft. There are two of such side blades, located at each of the two ends of the rotor, and they are mirror images.

FIGS. 5A and 5B are a front view of the discharge valve of the reactor wherein: FIG. 5A shows the discharge valve of the reactor being closed, and FIG. 5B shows the discharge valve being opened.

DETAILED DESCRIPTION OF PREFERRED EMBODIMENTS OF THE INVENTION

Figure 1:
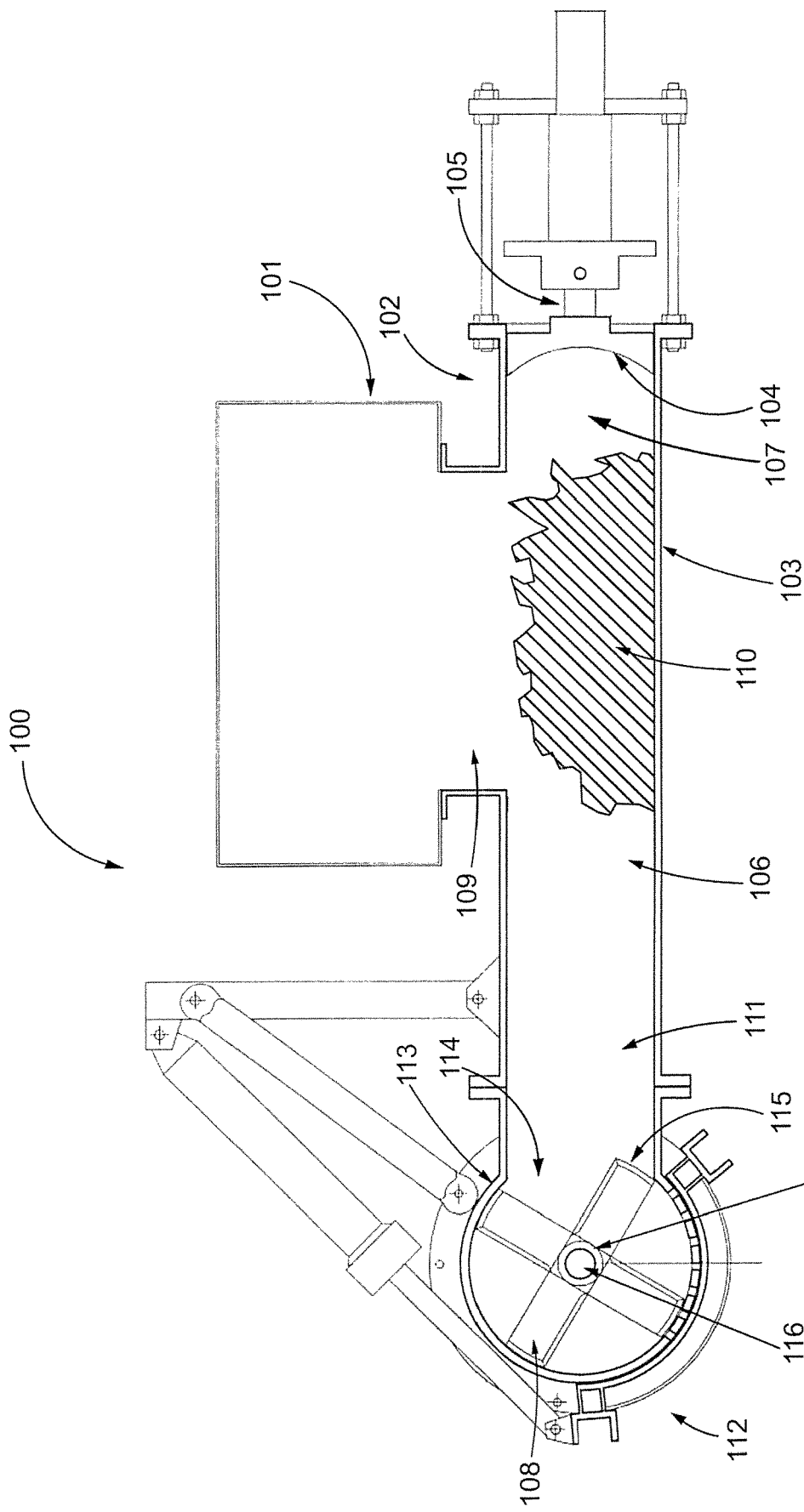
FIG. 1 is a cross-sectional side view of the apparatus of the present invention.

Then, reference will be made to a preferred embodiment of the procedure of the present invention at a pilot plant scale for the treatment of solid urban waste, that is, a procedure for the treatment of up to approximately 2000 kg per day of waste, even though the technical concepts are likewise applicable to an industrial plant that may process tens and hundreds of tons per day of waste.

The procedure of the present invention begins with a series of steps that are not novel per se and comprise the following stages:
a) Providing solid urban waste to a waste treatment plant;
b) Loading inorganic and organic waste, partially or totally mixed and cross-contaminated, in a shredder, tearing the bags, if any, and unloading their contents on a conveyor belt of wide exposure and predetermined speed for the initial selection of recyclable waste;
c) Successively extracting the following waste during the initial selection:
   batteries, electronic components, microprocessors, home appliances, etc., by manual o mechanical selection;
   bottles and glass and plastic containers by manual or mechanical selection;
   ferromagnetic metals: sheets, iron, bolts, screws, nails, hinges, etc., through magnetic systems;
   non-ferrous metals: lead, aluminium, bronze, copper, brass, by manual, mechanical, electromechanical or electromagnetic selection;
and sending this waste for its treatment outside the treatment plant;
d) Sending the remaining waste, referred to as rejection, to a grinding and crushing machine with articulated rollers, which rotate in a circular hopper, for homogenization;
such remaining waste is referred to as rejection, which consists of solid and liquid organic remainders of biological origin, contaminated with inorganic and organic remainders that have not been extracted during the initial selection;

The percentage of rejection relative to the total weight of treated waste varies widely and depends significantly on the geographical area the urban waste comes from, the time of the year and the standard of living of the inhabitants that produce the waste.
e) Loading the rejection into the grinding and crushing machine and adding a binder and optionally rubble, through a worm drive, and water through a metering nozzle.

The binder is concrete, that is, the resulting material from the calcination of calcareous minerals and clays (clinker), together with the customary additives used for these types of supplies in the construction industry.

Rubble is to be understood as any type of surplus material coming from the construction industry, such as tiles and subfloors and subpavements, bricks, renders, etc.

The amount of concrete that is added to the grinding and crushing machine comprises between 20% and 30% relative to the amount of waste that is loaded into said machine.

Depending on the percentage content of water that the waste contain, which are loaded to the grinding and crunching machine, generally about 5-10%, water is added, in such a way that the final percentage of water content is between 25% and 35% of total weight of the mixture of waste/binder/water.

In the event of very high water content in the waste, the addition of rubble is expected, the function of which is absorbing the humidity excess of the final mixture, or any other material that has the same function.

The operation of the grinding and crushing machine is continuous. The materials that are added are ground, crushed and partially homogenized, and the supernatant material, whose granulometry is between 5 and 12 mm, is continuously removed by a 'supplier', located in the upper part of the machine, and which is monitored by a microprocessing unit that regulates the amount of material that is removed from the grinding and crushing machine, and it is sent to a conveyor belt.

The removed material is a non-homogeneous and irregular mixture that is sent by a conveyor belt to a hopper that feeds a piston extruding machine, with hydraulic operation, connected to a reactor.
f) This and the following stages gather the novel and inventive characteristics of the invention.

The mixture from the previous stage is poured into the hopper of the piston extruding machine, provided with a hydraulic pump that produces hydraulic pressure, which actuates a hydraulic cylinder that moves a piston into the extrusion cavity.

The extrusion cavity consists of a cylinder, inside which the piston moves, and which has three sections of approximately the same volume, e.g., 10 L in the case of a pilot plant.

The first section of the cylinder of the extrusion cavity is referred to as passive chamber, where the piston begins its travel until reaching the second section, referred to as entry chamber.

The entry chamber has an opening connected to the hopper of the extruding machine, entering a fraction of 10 L of the mixture into the entry chamber. After loading this mixture volume in the entry chamber of the cylinder of the extruding machine, the mixture inlet valve of the hopper closes.

Then, the piston actuated by the hydraulic pressure presses and pushes the mixture volume into the third section of the cylinder of the extrusion cavity. This third section is referred to as compression chamber. In this compression chamber, the mixture, as being pressed by the piston, fills up completely the cylinder section and is taken to the end of the cylinder of the extruding machine.

The end of the compression chamber is hermetically connected to a device referred to as reactor.

g) The reactor is a cylindrical steel drum whose longitudinal shaft is arranged horizontally and coupled transversally, at 90°, through an opening, with the end of the compression chamber of the cylinder of the extruding machine (see below the description of the Figures).

The longitudinal shaft of the reactor comprises a rotatory steel shaft that is inserted in the beds, arranged at the ends (or 'heads') of the reactor. In the shaft, there are some steel blades whose ends play the roles of cutting, hammering, punching and hydraulic helix as they rotate. Between the end of the blades and the wall or dome of the reactor there is a 0.2-mm clearance.

In the context of the invention, this clearance or free space between the end of the blades and the wall of the reactor is referred to as boundary layer of the reactor.

The rotatory shaft of the reactor and the blades are jointly referred to as rotor. Furthermore, the reactor shaft is coupled with an electric motor that allows the rotor to rotate at high speed.

The structural and functional aspects of the reactor and rotor will be described in further detail in the detailed description of the apparatus of the present invention referenced in the Figures attached to this description.

Due to the number of blades and their geometrical shapes, the rotation at high speed makes the mixture to 'see and come to an invisible wall' upon reaching the end of the compression chamber.

This effect can be better seen and understood recalling the example of the blades of a fan, which by rotating fast form an invisible wall that rejects any object that wants to penetrate it.

Correspondingly, once the mixture pressed by the piston comes into contact with the rotor, the following series of events occur:

The first event that occurs, at low gauge pressure in the mixture and low consumption of the electric motor, is a reverse bombardment or violent rejection of matter that comes into contact with the blades. The grinding and mixing occurs without pressure inside the mixture.

The second event occurs as a consequence of the slight increase in the pressure of the piston that presses the mixture against the rotor. The mixture starts rotating in the opposite direction of the rotor, grinding and mixing at low pressure.

During the third event, a thinner grinding and a stronger mixing are continued. This event occurs at a pressure of approximately 490 kPa (approx. 5 kg/cm$^2$) at the core of the mixture.

During the fourth event, the pressure of the piston keeps rising and the temperature of the mixture reaches 75° C. due to the effect of friction, producing an additional homogenization of the mixture.

During the fifth event, the mixture loses all the built up gas or possible trapped air bubbles.

During the sixth event, the pressure on the mixture is very high, at about 980 kPa (approx. 10 kg/cm$^2$), which gives rise to a new stage.

h) In this stage, the mixture subjected to high pressure rotates between the piston and the rotating front of the rotor at approximately 30 km/h in the opposite direction of the rotor and is forced by the blades to penetrate the boundary layer of the reactor, thus forming a 0.2 mm-thick perimeter film that acts as a complete hydraulic seal for both the reactor/extruding machine.

The volume of this perimeter film constitutes 5% of the total mixture volume; the remaining 95% continues rotating inside the compression chamber.

The perimeter film circulates at a speed of approximately 150 km/h and produces an exchange of total mixture volume in just 2 seconds.

At this moment of the procedure, and when the mixture is subjected to an increase in pressure that reaches approximately 1176 kPa (approx. 12 kg/cm$^2$) of piston pressure on the mixture at the compression chamber, a physics phenomenon occurs on the rotor shaft.

Therefore, as the pressure of the mixture on the rotor blades increases, its shaft is slightly curved in the same direction as the forward movement of the mixture, shifting up to 0.2 mm in the centre of the rotor shaft to a standing position and building up huge potential energy, equivalent to 2 tons on the rotor shaft.

At this moment, a physics event of resonance occurs consisting in the rotor shaft emitting a shock wave train comprising the fundamental wave and possible harmonics. That is, the rotor shaft, slightly rotating in a curvy manner, now transforms its potential energy into vibration or resonance kinetic energy.

The low frequency (less than 80 Hz) shock wave train subjects the mixture that is inside the compression chamber at low circulation speed relative to the circulation speed of the boundary layer, to violent stirring.

The result of this physics phenomenon is that at the core of the mixture a collapse occurs, due to vibration and friction, of all these complex structures of biological tissues, even partially or totally taking apart organic and inorganic, polymeric complex molecules, while this episode is accompanied by a geometrical increase of the temperature, possibly producing microvolumes within the mixture subjected to very high temperatures.

This resonance phenomenon occurs because the rotor, which rotates at 2900 rpm, is pressed by the mixture, which acts as an intermediate piston, and which in turn curves the rotor shaft that builds up huge potential energy, equivalent to 2 tons on the rotor shaft.

At this point, the rotor shaft returns the potential energy built up as a giant spring giving rise to the mechanical resonance, that is, the emission of a shock wave train.

Within the boundary layer, the collapse of said boundary layer occurs, in this case, even more radically while extreme pressure peaks are produced.

When the reactor enters into resonance, this event consumes a great amount of instant energy. In order to solve this problem, there is a flywheel that is coupled with the electric motor shaft and which builds up kinetic energy.

When the rotor slows down 100 rpm, the wheel delivers 74,570 J/s (approx. 100 HP) preventing the motor from leaving the electric synchronism and preventing the subsequent decrease of tension in the line.

The resonance phenomenon lasts approximately 1 to 2 seconds.

Subsequently, the hydraulic pressure on the extruder piston is removed for 1.5 to 2 seconds, and the compression cycle of the mixture on the rotor is repeated until a new emission of shock waves is produced. The complete procedure is monitored automatically by a microprocessor connected to suitable sensors that the apparatus comprises according to the present invention.

This synchronized way of operating the extruding machine and both the reactor/rotor allows replacing the electric motor energy to the wheel, thus preventing the decrease of tension to abrupt consumption.

The compression and decompression cycles are repeated until the mixture temperature reaches approximately 92° C. The sensors of the apparatus detect this temperature.

The number of compression cycles depends on the nature of the treated waste, but this procedure stage needs generally between 25 and 50 seconds.

i) Final procedure stage. After 25-50 seconds, the discharge valve of the reactor is opened and the extruding machine discharges, by piston pressure on the mixture and through the boundary layer and openings arranged at the bottom of the reactor, the treated mixture placing it on a conveyor belt that sends it to a storing area where the mixture, in a granulated form, is set and is converted into an aggregate.

Description of a Preferred Embodiment of the Inventive Apparatus

A preferred embodiment is described hereinafter in reference to the accompanying figures of this description.

The material coming from the grinding and crushing machine is sent through a conveyor belt to a hopper that feeds a piston extruding machine, hydraulically operated and connected to a reactor.

FIG. 1 schematically shows the apparatus (100) comprising an extruding machine (102) and the reactor (112).

The mixture is fed through a conveyor belt (not shown), to a hopper (101) of the extruding machine (102).

The extruding machine consists of an extrusion cylinder (103) through which a piston (104) circulates, actuated by the hydraulic pressure from a hydraulic pump (not shown), which produces hydraulic pressure that actuates a hydraulic cylinder (105) which moves the piston into the extrusion cavity (106).

The extrusion cavity consists of a 20-cm internal diameter cylinder, inside which the piston moves, and which has three sections of approximately the same volume, e.g., 10 L in the case of a pilot plant.

The first section of the cylinder of the extrusion cavity is referred to as the passive chamber (107), inside which the piston begins its 45-cm travel until reaching the second section, referred to as access chamber (110). For reasons of space, the passive chamber is represented in FIG. 1 as shorter than the other two sections.

The access chamber, of 45 cm in length, has an opening (109) connected to the hopper (101) which loads a 10-L fraction of the mixture into the access chamber. After loading this mixture volume into the access chamber of the cylinder of the extruding machine, the mixture inlet valve (not shown) of the hopper is closed.

Then, the piston actuated by the hydraulic pressure presses and pushes the mixture volume into the third section of the cylinder of the extrusion cavity. This third section, of 50 cm in length, is referred to as compression chamber (111).

In this compression chamber, the mixture, as being pressed by the piston, fills up completely the cylinder section and is dragged to the end of the cylinder of the extruding machine.

The end of the compression chamber is hermetically connected to a device referred to as reactor (112).

The reactor is a cylindrical steel drum (113), of 23 cm in length and 30 cm of internal diameter, whose longitudinal shaft is horizontally arranged and transversely coupled, at 90° with the extrusion axis defined by the extrusion cavity, through an opening (114) with the end of the compression chamber (115) of the cylinder of the extruding machine.

This longitudinal shaft of the reactor is formed by a rotatory steel shaft (116) that is inserted into the beds (117), arranged at the ends (or heads) of the reactor. Along the shaft, there are some SAE 5560 steel blades (108), the ends of which play the roles of cutting, hammering, punch nipping and hydraulic helix as they rotate. Between the end of the blades and the wall or dome of the reactor there is a 0.2-mm thick clearance.

In the context of the invention, this clearance or free space between the end of the blades and the wall of the reactor is referred to as boundary layer of the reactor.

The rotatory shaft of the reactor and the blades are jointly referred to as rotor. Furthermore, the reactor shaft is coupled with an electric motor (not shown in FIG. 1) that allows the rotor to rotate at high speed.

The free end of the blades displays an external surface whose width, in the direction of the longitudinal shaft of the reactor, is partially overlapped with the width of the adjacent blades, such that, as they rotate, the covering surface generated by all the blades is a continuous surface, where the width is to be understood as the distance, in the direction of the longitudinal shaft of the reactor, from the point of the external surface closest to an end of the reactor to the point of the external surface closest to the opposite end of the reactor.

Due to the number of blades and their geometrical shapes, rotation at high speed makes the mixture to 'see and come to an invisible wall' by reaching the end of the compression chamber.

This effect can be better seen and understood recalling the example of the blades of a fan, which by rotating fast form an invisible wall that rejects any object that wants to penetrate it.

Figure 2:
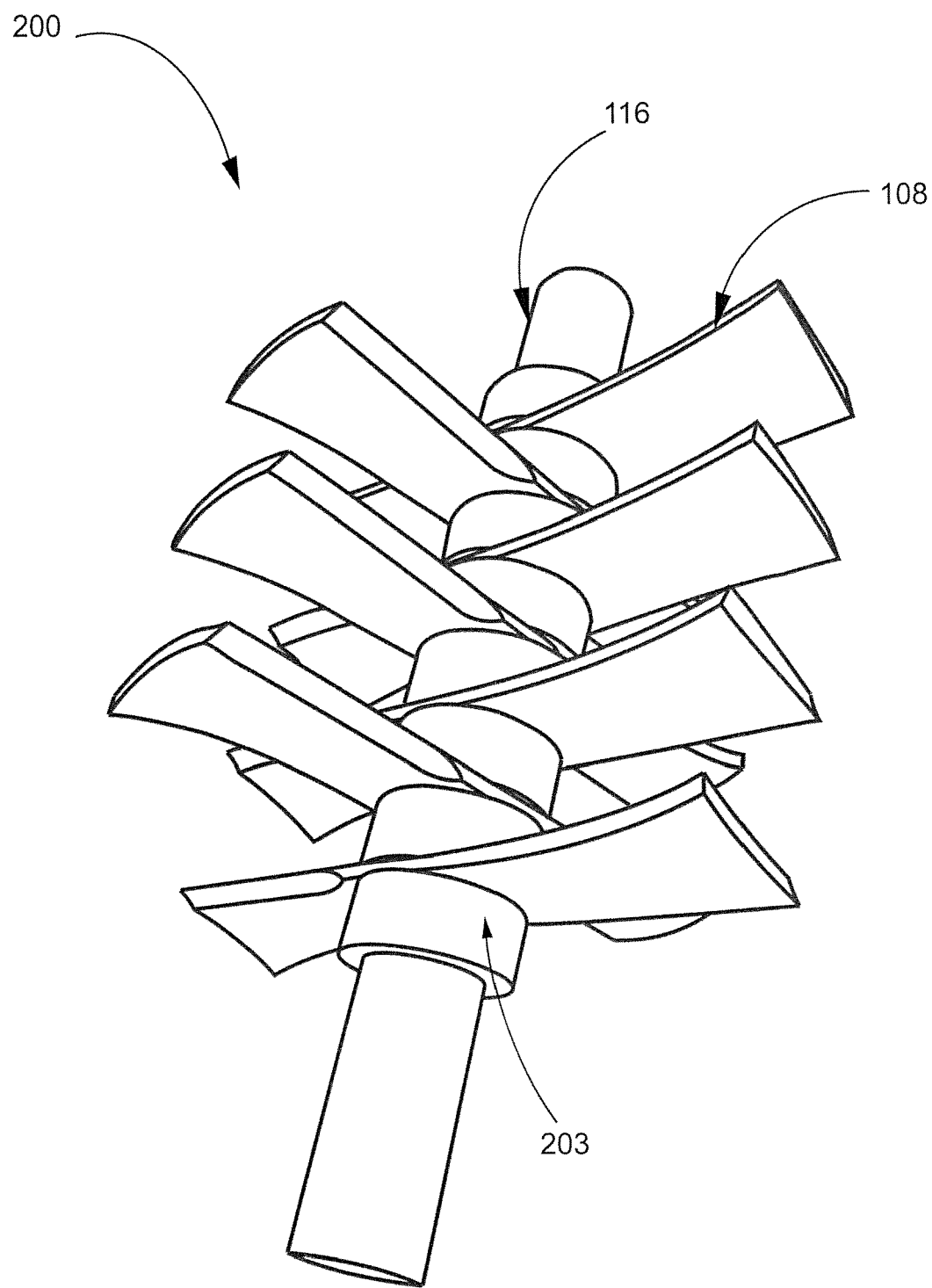
FIG. 2 is a perspective view of the rotor.

FIG. 2 represents a perspective view of the rotor (200), formed by 7 blades (108), which are coupled with the rotor shaft (116).

The rotor shaft (116) is made of SAE 4140 steel, whose hardness exceeds 25 Rc (Rockwell hardness), with a diameter of 50 mm and a bed support (total length of the shaft) of 30 cm.

These measures allow the longitudinal centre of the shaft to ripple and vibrate thus tuning with the fundamental wavelength and the possible harmonics.

The bearings (also referred to as roller-bearings) of the bed contain the shaft, which allows a slight angular variation and facilitates the shaft ripple and resonance.

The hubs (203) that are threaded in the shaft and that separate the blades of the rotor from one another have a curved geometry among them and act as vertebrae of the spine formed by the rotor shaft.

The blades, whose number is variable and dependent on the types of urban waste that are to be treated (7 blades in the case of FIG. 2), are made of SAE 5560 steel and have a nucleus hardness of 25 Rc and 45 Rc in their external perimeter.

Each blade is 29.96 cm long, but its function is performed only in the last 3 cm closer to the boundary layer.

For this reason, the rotor is made of any steel capable of resounding while the reactor is built with very low-resonance foundry.

It is to be understood that the reactor should not resound, and it behaves as a non-resounding solid body. If it did resound, the effect produced by the shock waves generated by the rotor would be lost.

The rotor has internal blades, which carry out the mixture processing, and side blades, which are arranged at the ends of the rotor and work basically as a hydraulic seal.

Figure 4A:
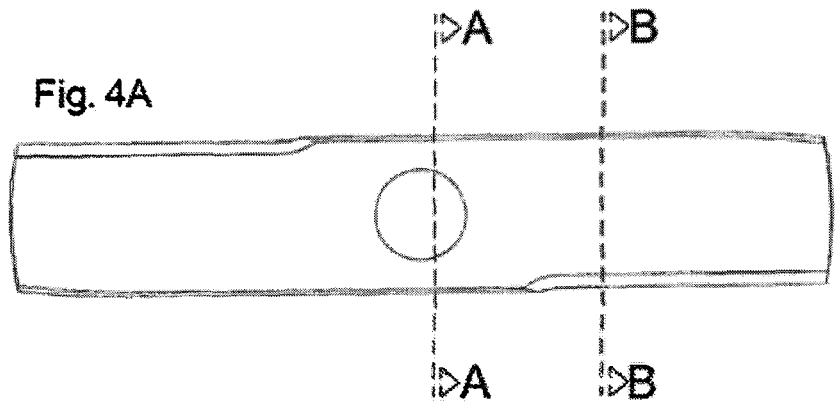

FIGS. 4A, 4B, 4C, 4D, and 4E are a group of views of the blades that support the rotor shaft, wherein:

FIG. 4A represents a ground view of the internal blade that supports the rotor shaft.

Figure 4C:
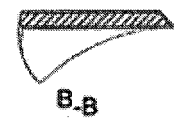
Figure 4B:

FIG. 4B represents a side front view of the internal blade that supports the rotor shaft.

Figure 4D:

FIG. 4C represents a cross-section of the internal blade at the B-B cut, while FIG. 4D represents a cross-section of the internal blade at the A-A cut.

Figure 4E:
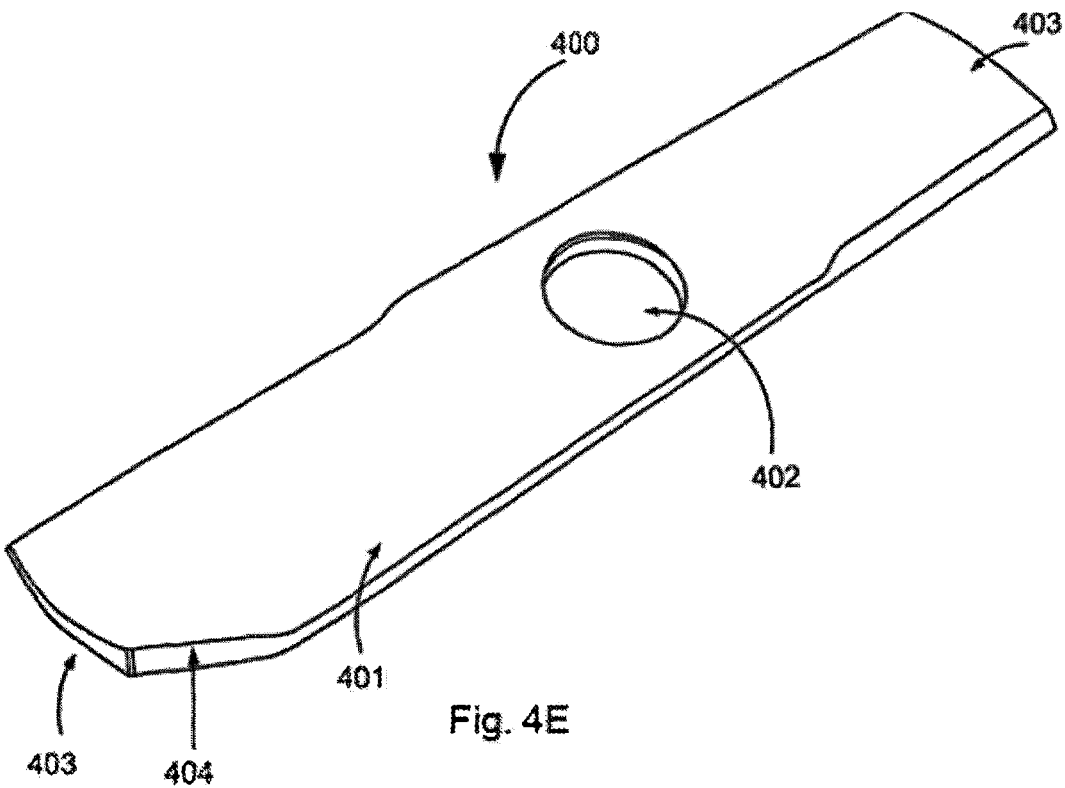
Figure 5A:
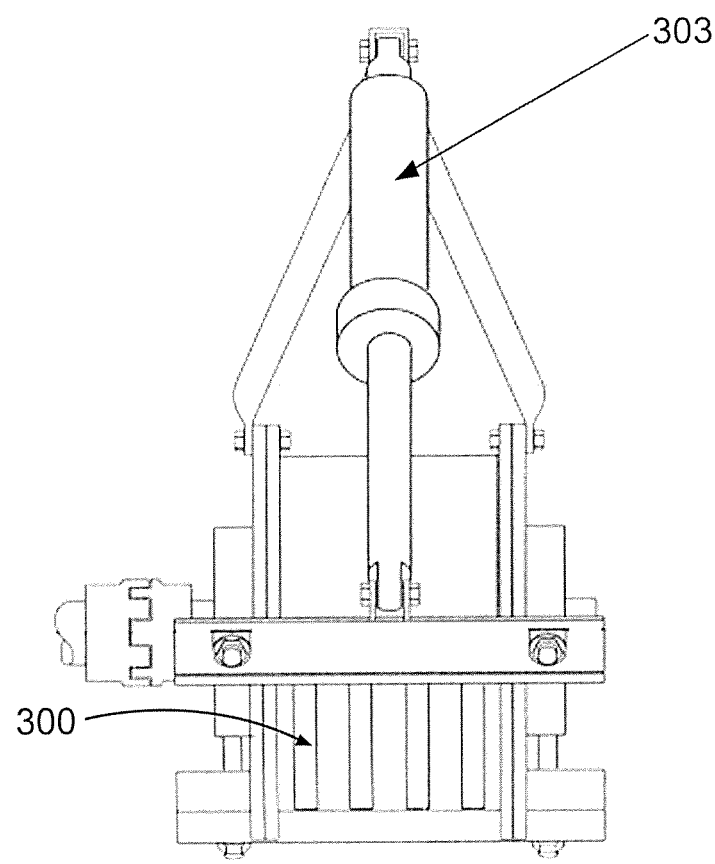
Figure 5B:
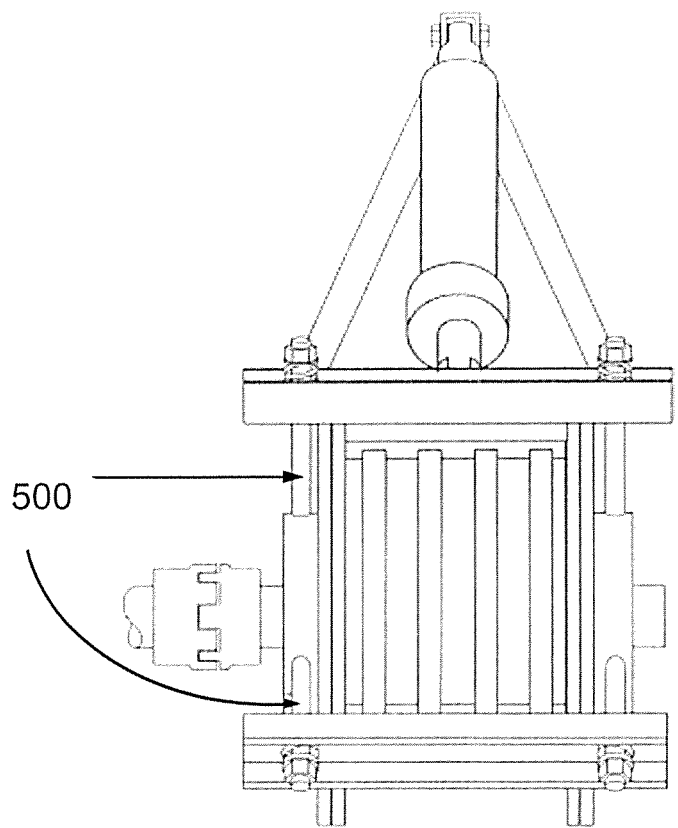

FIG. 4E is a perspective view of one of the side blades (400) that supports the rotor shaft.

The blade (400) has a rectangular configuration in the shape of a helix (401), with a circular hole (402) located in the centre of the rectangle and designed for being threaded in the rotor shaft between two trapping hubs.

The external surface (403) of the blade has a longitudinal circular shape that imitates the curvature of the internal wall of the reactor, allowing the blade diameter, from the centre of the hole to the external surface of the helix, to have a 0.2-mm clearance between said external surface and the wall of the reactor.

Both side blades are located at each of the two ends of the rotor shaft and are mirror images.

FIG. 4E represents a blade that shows a curvature (404) at one of its ends with an angle of attack, in relation to the surface of the blade plane, from 0 to 40° in relation to the rotation plane.

Figure 3A:
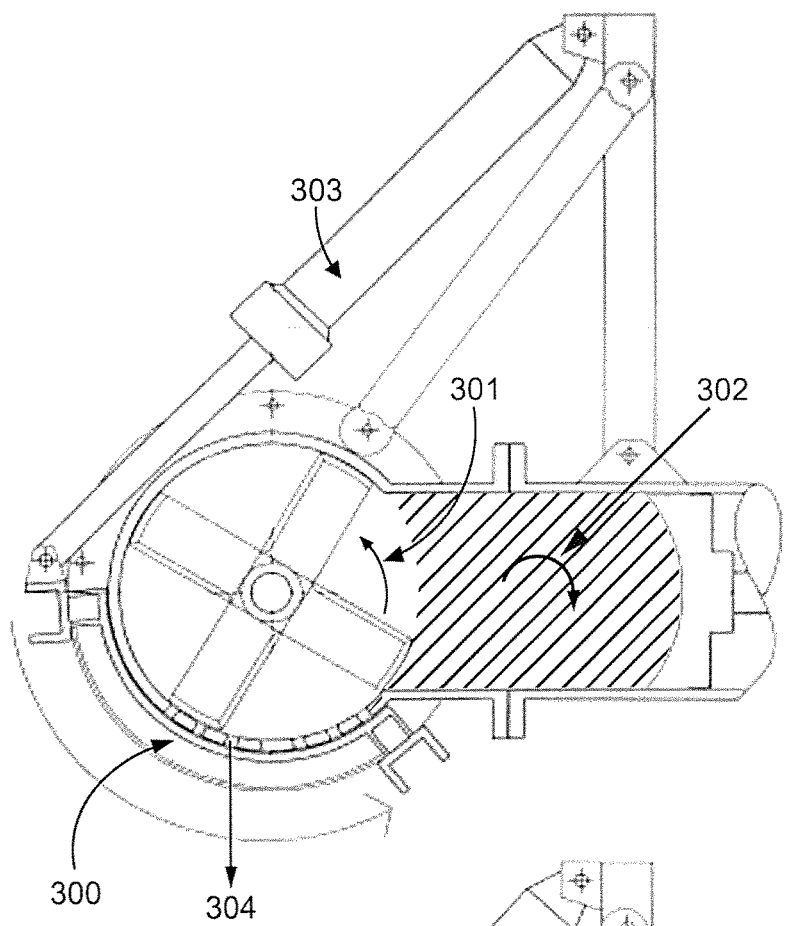
FIGS. 3A and 3B are cross-sectional side views of a section of the apparatus of the invention, showing in FIG. 3A the compression stage of the mixture against the blades of the rotor, with the discharge valve of the reactor being closed.
Figure 3B:
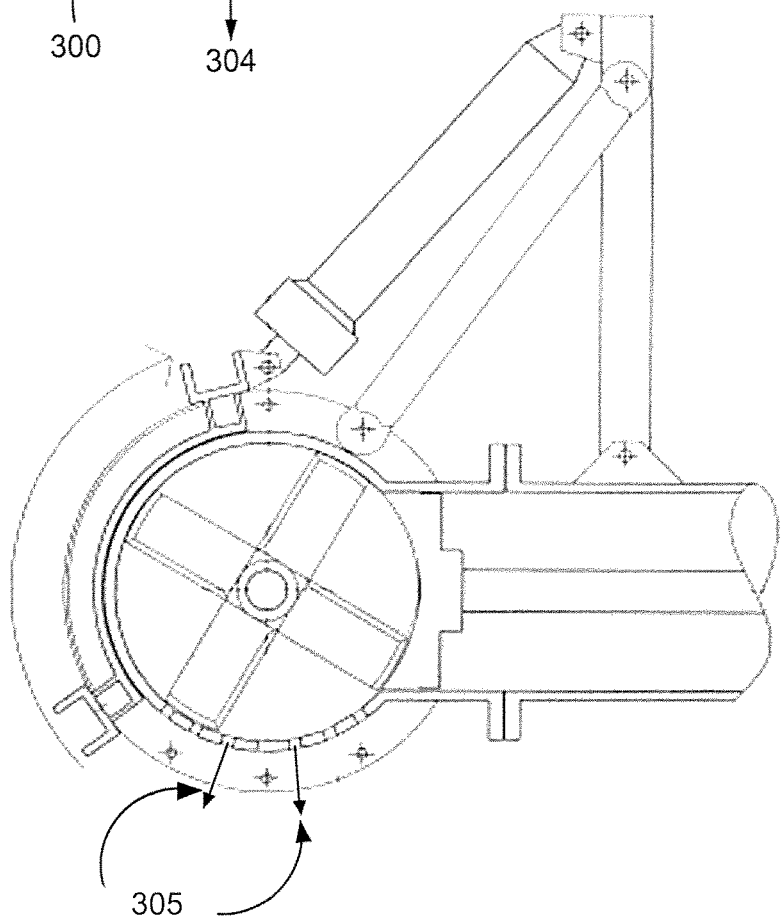

FIGS. 3A and 3B represent a cross-sectional side view of the section of the compression chamber coupled with the reactor.

FIG. 3A represents the cross-section wherein the reactor is processing the mixture in the final stages of the procedure of the present invention, with the discharge valve (300) of the reactor being closed. During these final stages, the reactor rotates counterclockwise, in the direction represented by the arrow (301), while the mixture rotates in the opposite direction, following the direction of the arrow (302).

In these final stages, characterised by the compression of the mixture effected by the piston of the extruding machine, the rejection of the mixture as a result of the circulation of the blades, the forced penetration of the mixture into the boundary layer area, and the violent phenomenon that takes place once the rotor shaft delivers its potential energy, built up during the curvature of the rotor shaft by pressure, in the form of vibration or resonance energy, the valve (300) of the reactor being closed by a hydraulic device (303) which completely seals the reactor and prevents the mixture in the boundary layer area from being released through the openings (304).

Once the mixture has been completely processed through a series of pressure and decompression cycles, as described above, the discharge valve of the reactor opens automatically and the mixture is released and sent to a conveyor belt.

This final stage of the procedure is consistent with the arrangement of the apparatus, as represented in FIG. 3B.

The hydraulic device (303) has retracted the discharge valve of the reactor (300) up to an 'open' position, thus allowing the mixture present in the boundary layer area to be discharged through the openings (304), depending on the direction of the arrows (305) towards a conveyor belt (not shown).

All the mixture present in the compression chamber is propelled by the piston of the extruding machine towards the boundary layer area and discharged through the openings of the discharge valve of the reactor towards the conveyor belt, which sends de mixture, located in the initial stages of the setting process, towards a storing area, where the setting is completed.

Once the setting process of the mixture finishes, a completely inert and non-polluting aggregate is obtained, which may be returned to nature as it behaves like sand.

The aggregate may also be used in the construction industry, for making eco-friendly bricks for the drying of road bases and as subfloors in any type of building.

Figure 6:
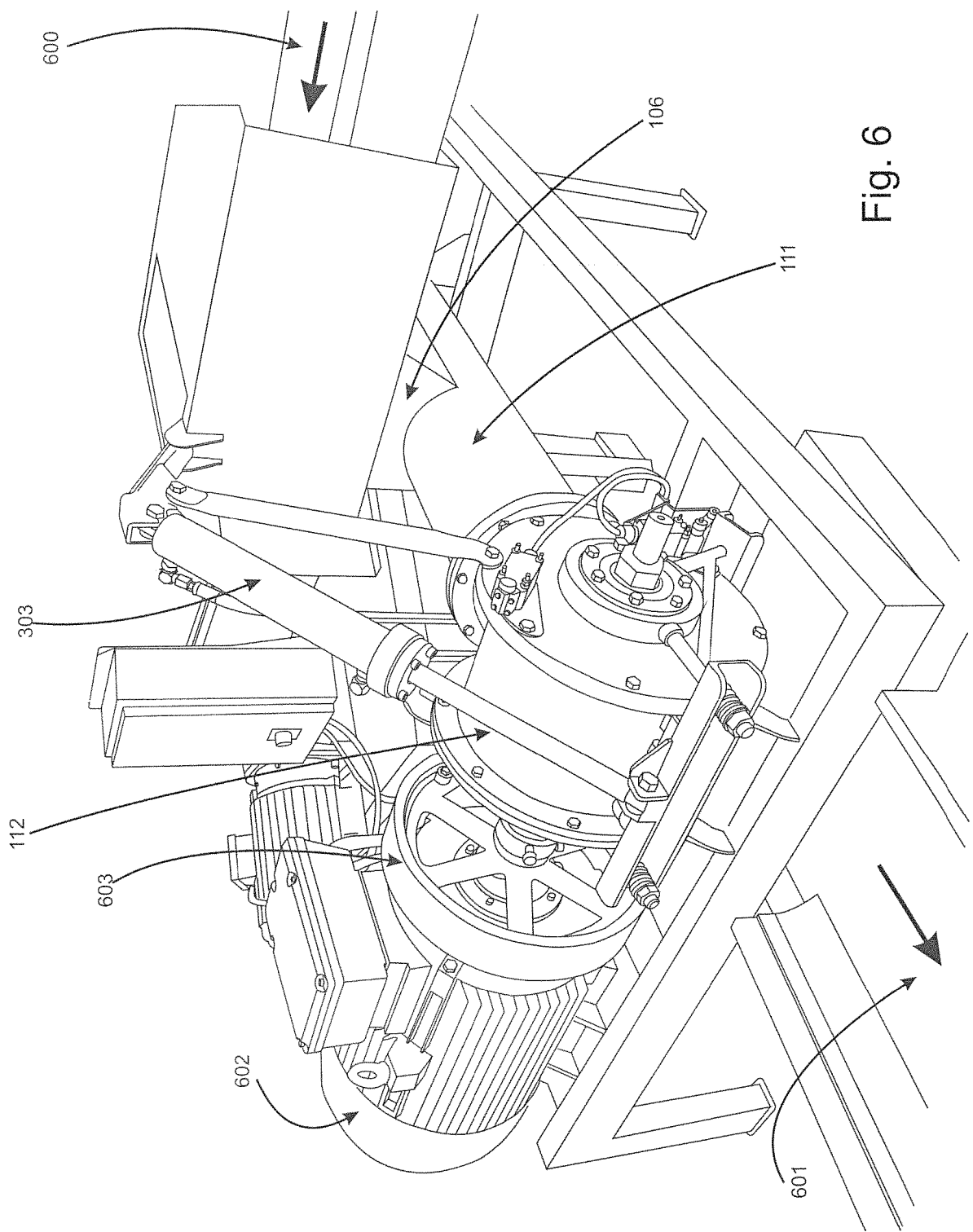
FIG. 6 is a perspective view of the electric engine, the flywheel and the compression chamber coupled with the reactor and its discharge valve.

FIG. 6 is a schematic perspective view of the apparatus according to the present invention, showing the conveyor belts (600, 601) that respectively feed the hopper (106) and remove the treated mixture from the reactor (112).

FIG. 6 also shows the compression chamber (111) of the extruding machine connected to the reactor (112), the electric motor (602), the flywheel (603) and the hydraulic device (303) for opening and closing the discharge valve of the reactor.

The invention claimed is:

1. An apparatus for transforming organic and inorganic solid urban waste into aggregates, comprising:
an extruding machine connected to a reactor;
wherein the extruding machine comprises an extrusion cylinder through which a piston circulates inside an extrusion cavity that defines an extrusion axis,
the end of the extrusion cavity is hermetically connected to the reactor;
the reactor is a drum with rotational symmetry whose longitudinal shaft is coupled by means of an opening, with the end of the extrusion cavity of the cylinder of the extruding machine;
the longitudinal shaft of the reactor comprises a rotary shaft that is inserted into beds, which are arranged at the ends of the reactor;
in said rotary shaft some steel blades are arranged;
between the end of the steel blades and a wall or dome of the reactor there is a clearance, forming a boundary layer of the reactor,
wherein the rotary shaft of the reactor and the steel blades are a rotor, said rotary shaft of the reactor being coupled with an electric motor able to rotate the rotor at a speed of 2900 rpm, and wherein the reactor has a discharge valve;

wherein the apparatus is configured to receive a mixture of rejected material from solid waste and includes:

a compression stage where the mixture is compressed by the piston of the extruding machine moving forward until it comes into contact with the steel blades of the reactor, which steel blades reject the mixture, propel the mixture to the interior of the extrusion cavity, and prevent the mixture from moving forward with the resulting increase of pressure a processing stage where:

(a) the piston moves forward, to further compress the mixture and force the mixture to penetrate the boundary layer of the reactor, forming a perimeter film, (b) the rotary shaft enters into resonance, where the potential energy built up by the rotary shaft is released as an emission of a shock wave, subjecting the mixture that is inside the extrusion cavity to a violent stirring, and repeatedly compressing the mixture on the rotor which is in the boundary layer to pressure peaks produced by the vibration of the rotary shaft, (c) once the resonance phenomenon is finished, the pressure on the piston of the extruding machine is reduced, decompressing the mixture, and the compression of the mixture on the rotor is repeated until the rotary shaft enters into resonance once again and there is a new emission of shock waves, and (d) the resonance and decompression cycles are repeated until the temperature of the mixture reaches 85° C. to 98° C. to transform the mixture of organic and inorganic solid urban waste into aggregates; and the aggregates are discharged in a discharging stage.

2. The apparatus of claim 1, further comprising a hydraulic pump that produces hydraulic pressure which actuates a hydraulic cylinder that moves the piston into the extrusion cavity.

3. The apparatus of claim 1, wherein the extrusion cavity comprises a cylinder, in which the piston moves, and the cylinder has three sections: a first section which is a passive chamber, a second section which is an access chamber and a third section which is a compression chamber.

4. The apparatus of claim 3, wherein the cylinder has an internal diameter of 20 cm.

5. The apparatus of claim 3, wherein each section has a volume of 10 L.

6. The apparatus of claim 3, further comprising a feeding hopper, with a stop valve, connected to an opening arranged in the access chamber.

7. The apparatus of claim 1, wherein the reactor is a cylindrical steel drum of 23 cm in length and 30 cm of internal diameter.

8. The apparatus of claim 1, wherein the boundary layer of the reactor has a thickness between 0.1 and 0.5 mm.

9. The apparatus of claim 1, wherein the rotor is formed by 7 steel blades which are coupled with the rotary shaft, the rotary shaft of the same being made of SAE 4140 steel blade, whose hardness exceeds 25 Rc, with a diameter of 50 mm and a bed support of 30 cm.

10. The apparatus of claim 1, wherein the beds include bearings which contain the rotary shaft allowing an angular variation.

11. The apparatus of claim 1, further comprising hubs that are threaded in the rotary shaft and that separate the steel blades of the rotary shaft from one another and have their opposite faces divergent to one another, to generate a clearance that increases moving away from the rotary shaft.

12. The apparatus of claim 1, wherein the steel blades are made of steel and have a nucleus hardness of 25 Rc and 45 Rc in their external perimeter.

13. The apparatus of claim 1, wherein the reactor is built with foundry.

14. The apparatus of claim 1, wherein a free end of the steel blades includes an external surface whose width, in the direction of the longitudinal shaft of the reactor, is partially overlapped with the width of adjacent steel blades, such that, as they rotate, a covering surface generated by all the steel blades is a continuous surface, where the width is the distance, in the direction of the longitudinal shaft of the reactor, from a point of the external surface closest to an end of the reactor to the point of the external surface closest to an opposite end of the reactor.

15. The apparatus of claim 1, wherein the reactor is transversely coupled, at 90° to an extrusion axis, with an end of the extrusion cavity of the cylinder of the extruding machine.

16. The apparatus of claim 1, wherein the boundary layer of the reactor has a thickness of 0.2 mm.

* * * * *